(12) United States Patent
Ng et al.

(10) Patent No.: US 10,528,590 B2
(45) Date of Patent: Jan. 7, 2020

(54) OPTIMIZING A QUERY WITH EXTREMA FUNCTION USING IN-MEMORY DATA SUMMARIES ON THE STORAGE SERVER

(71) Applicant: Oracle International Corporation, Redwood Shores, CA (US)

(72) Inventors: Adrian Ng, Redwood City, CA (US); Krishnan Meiyyappan, Fremont, CA (US); Alexander Tsukerman, Foster City, CA (US); Dmitry Potapov, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 537 days.

(21) Appl. No.: 14/726,372

(22) Filed: May 29, 2015

(65) Prior Publication Data

US 2016/0092507 A1 Mar. 31, 2016

Related U.S. Application Data

(60) Provisional application No. 62/056,331, filed on Sep. 26, 2014.

(51) Int. Cl.
*G06F 3/06* (2006.01)
*G06F 16/22* (2019.01)
*G06F 16/27* (2019.01)

(52) U.S. Cl.
CPC .............. *G06F 16/27* (2019.01); *G06F 16/22* (2019.01)

(58) Field of Classification Search
CPC ......... G06F 17/30312; G06F 17/30575; G06F 3/067; G06F 3/0619; G06F 3/065; G06F 16/22; G06F 16/27
See application file for complete search history.

(56) References Cited

U.S. PATENT DOCUMENTS 4,425,615 A   1/1984 Swenson et al.
5,504,890 A   4/1996 Sanford
(Continued)

FOREIGN PATENT DOCUMENTS

CN   101150483 A   3/2008
EP   0706140 A1   10/1996
(Continued)

OTHER PUBLICATIONS

Loizos et al., "Improving Join Efficiency with Extended Bloom Filter Operations", AMC, 2007, 8 pages.
(Continued)

*Primary Examiner* — James Trujillo
*Assistant Examiner* — Jessica N Le
(74) *Attorney, Agent, or Firm* — Hickman Palermo Becker Bingham LLP (57) ABSTRACT

Techniques for optimizing a query with an extrema function are provided. In main memory, a data summary is maintained for a plurality of extents stored by at least one storage server. The data summary includes an extent minimum value and an extent maximum value for one or more columns. A storage server request is received, from a database server, based on a query with an extrema function applied to a particular column of a particular table. The data summaries for a set of relevant extents are processed by maintaining at least one global extrema value corresponding to the extrema function and, for each relevant extent of the set of relevant extents, determining whether to scan records of the relevant extent based on at least one of the global extrema value and an extent summary value of the data summary of the relevant extent.

14 Claims, 5 Drawing Sheets

(56) References Cited

U.S. PATENT DOCUMENTS

| | | | |
|---|---|---|---|
| 5,717,893 A | 2/1998 | Mattson | |
| 5,765,034 A | 6/1998 | Recio | |
| 5,848,405 A * | 12/1998 | Norcott | G06F 17/30595 |
| 5,848,408 A | 12/1998 | Jakobsson et al. | |
| 5,987,453 A | 11/1999 | Krishna et al. | |
| 5,999,943 A | 12/1999 | Nori et al. | |
| 6,023,695 A | 2/2000 | Osborn et al. | |
| 6,029,166 A * | 2/2000 | Mutalik | G06F 3/0619 |
| 6,035,306 A | 3/2000 | Lowenthal et al. | |
| 6,044,367 A | 3/2000 | Wolff | |
| 6,049,798 A | 4/2000 | Bishop et al. | |
| 6,128,621 A | 10/2000 | Weisz | |
| 6,618,729 B1 | 9/2003 | Bhashyam et al. | |
| 6,665,684 B2 | 12/2003 | Zait et al. | |
| 6,728,823 B1 | 4/2004 | Walker et al. | |
| 6,886,084 B2 | 4/2005 | Kawashima et al. | |
| 6,922,754 B2 | 7/2005 | Liu et al. | |
| 6,928,451 B2 | 8/2005 | Mogi et al. | |
| 6,957,210 B1 | 10/2005 | Ramesh | |
| 6,957,222 B1 | 10/2005 | Ramesh | |
| 7,047,253 B1 | 5/2006 | Murthy et al. | |
| 7,069,324 B1 | 6/2006 | Tiwana et al. | |
| 7,092,954 B1 | 8/2006 | Ramesh | |
| 7,093,162 B2 | 8/2006 | Barga et al. | |
| 7,096,224 B2 | 8/2006 | Murthy et al. | |
| 7,159,076 B2 | 1/2007 | Madter | |
| 7,165,144 B2 | 1/2007 | Choubal et al. | |
| 7,228,354 B2 | 6/2007 | Chambliss et al. | |
| 7,231,387 B2 | 6/2007 | Sauermann et al. | |
| 7,237,027 B1 | 6/2007 | Raccah et al. | |
| 7,290,090 B2 | 10/2007 | Madter | |
| 7,461,147 B1 | 12/2008 | Mowat et al. | |
| 7,506,103 B2 | 3/2009 | Madter | |
| 7,904,562 B2 | 3/2011 | Takase et al. | |
| 8,244,984 B1 | 8/2012 | Glasco et al. | |
| 8,370,452 B2 | 2/2013 | Harvell et al. | |
| 8,601,473 B1 * | 12/2013 | Aron | G06F 9/45533 718/1 |
| 8,949,178 B2 * | 2/2015 | Zhao | G06F 17/30348 707/610 |
| 9,952,782 B1 | 4/2018 | Chandrasekaran | |
| 2002/0078068 A1 | 6/2002 | Krishnaprasad et al. | |
| 2002/0143755 A1 | 10/2002 | Wynblatt et al. | |
| 2003/0115324 A1 | 6/2003 | Blumenau et al. | |
| 2004/0003087 A1 | 1/2004 | Chambliss et al. | |
| 2004/0062106 A1 | 4/2004 | Ramesh et al. | |
| 2004/0064466 A1 | 4/2004 | Manikutty et al. | |
| 2004/0117441 A1 | 6/2004 | Liu et al. | |
| 2004/0225845 A1 | 11/2004 | Kruckemyer et al. | |
| 2004/0254943 A1 | 12/2004 | Malcolm | |
| 2005/0033756 A1 | 2/2005 | Kotomatharayil | |
| 2005/0055355 A1 | 3/2005 | Murthy et al. | |
| 2005/0056520 A1 | 4/2005 | Dharmapurikar et al. | |
| 2005/0120025 A1 | 6/2005 | Rodriguez et al. | |
| 2005/0160224 A1 | 7/2005 | Cuomo et al. | |
| 2005/0193160 A1 | 9/2005 | Bhatte et al. | |
| 2005/0210202 A1 | 9/2005 | Choubal et al. | |
| 2005/0283637 A1 | 12/2005 | Coldicott et al. | |
| 2006/0047670 A1 | 3/2006 | Yu et al. | |
| 2006/0106890 A1 | 5/2006 | Paul et al. | |
| 2006/0224451 A1 | 10/2006 | Kerschbrock et al. | |
| 2006/0224551 A1 | 10/2006 | Lariba-Pey et al. | |
| 2006/0277439 A1 | 12/2006 | Davia et al. | |
| 2007/0067575 A1 | 3/2007 | Morris et al. | |
| 2007/0124415 A1 | 5/2007 | Lev-Ran et al. | |
| 2007/0220348 A1 | 9/2007 | Mendoza et al. | |
| 2007/0260819 A1 | 11/2007 | Gao et al. | |
| 2007/0271570 A1 | 11/2007 | Brown et al. | |
| 2008/0016283 A1 | 1/2008 | Madter | |
| 2008/0046736 A1 | 2/2008 | Arimilli et al. | |
| 2008/0104283 A1 | 5/2008 | Shin et al. | |
| 2008/0147599 A1 | 6/2008 | Young-Lai | |
| 2008/0155229 A1 | 6/2008 | Beyer et al. | |
| 2008/0177803 A1 | 7/2008 | Fineberg et al. | |
| 2008/0195668 A1 | 8/2008 | Chandrasekar et al. | |
| 2008/0244209 A1 | 10/2008 | Seelam et al. | |
| 2008/0307266 A1 | 12/2008 | Chandrasekaran | |
| 2009/0019103 A1 * | 1/2009 | Tommaney | G06F 17/30445 709/201 |
| 2009/0106210 A1 * | 4/2009 | Slezak | G06F 17/30386 |
| 2009/0248871 A1 | 10/2009 | Takase et al. | |
| 2009/0328043 A1 * | 12/2009 | Vermette | G06F 9/466 718/101 |
| 2010/0017556 A1 | 1/2010 | Chin et al. | |
| 2010/0077107 A1 | 3/2010 | Lee et al. | |
| 2010/0082648 A1 * | 4/2010 | Potapov | G06F 3/0611 707/756 |
| 2010/0122026 A1 | 5/2010 | Umamageswaran et al. | |
| 2010/0125842 A1 * | 5/2010 | Friedman | G06F 9/4856 718/1 |
| 2010/0332901 A1 | 12/2010 | Nussbaum et al. | |
| 2011/0066791 A1 | 3/2011 | Goyal et al. | |
| 2012/0005184 A1 | 1/2012 | Thilagar et al. | |
| 2012/0144234 A1 | 6/2012 | Clark et al. | |
| 2013/0232190 A1 | 9/2013 | Miller et al. | |
| 2014/0052727 A1 * | 2/2014 | Xue | G06F 17/30598 707/737 |
| 2014/0095438 A1 * | 4/2014 | Marwah | G06F 17/30073 707/639 |
| 2014/0337314 A1 | 11/2014 | Potapov et al. | |
| 2015/0088812 A1 * | 3/2015 | Ziauddin | G06F 17/30289 707/609 |
| 2015/0100556 A1 | 4/2015 | Sekiguchi | |
| 2015/0242452 A1 * | 8/2015 | Dickie | G06F 17/30592 707/700 |
| 2015/0286681 A1 * | 10/2015 | Baer | G06F 17/30486 707/754 |
| 2016/0055210 A1 * | 2/2016 | Beavin | G06F 17/30466 707/754 |
| 2016/0092491 A1 * | 3/2016 | Cowling | G06F 17/30371 707/624 |
| 2017/0060918 A1 | 3/2017 | Iyer | |
| 2017/0166136 A1 | 4/2017 | Manicol | |
| 2017/0206199 A1 | 7/2017 | Umamageswaran | |
| 2019/0102346 A1 | 4/2019 | Wang et al. | |

FOREIGN PATENT DOCUMENTS

| | | |
|---|---|---|
| JP | 2002278704 A | 9/2002 |
| JP | 2003150419 A | 5/2003 |
| JP | 2004038758 A | 2/2004 |

OTHER PUBLICATIONS

Banerjee et al., "Oracle8i-the XML Enabled Data Management System", dated 2000 Proceedings 16th International, Conference on Data Engineering.

"XQuery 1.0: An XML Query Language", dated Dec. 14, 2010, W3C.

PCT/US2009/057590 International Search Report & Written Opinion dated Feb. 11, 2010, 16 pages.

PCT/US2009/057590 Current Claims, 10 pages.

IBM TDB, "A Scheduling Algorithm for Processing Mutually Exclusive Workloads in a multi-system Configuration", ip.com dated Aug. 19, 2002 (3 pages).

Dharmapurikar, Sarang, et al., "Deep Packet Inspection using Parallel Bloom Filters," retrieved from the internet at <http://www.arl.wustl.edu/~sarang/27_dharmapurikar_s_updated.pdf, retrieved on Oct. 28, 2005, 8 pages.

Bloom, Burton H. (1970), "Space/time trade-offs in hash coding with allowable errors", Communications of the ACM 13 (7): 422-426.

Oracle, "Data Warehousing on Oracle RAC Best Practices," Oct. 2008, 28 pages. http://www.oracle.com/technology/products/database/clustering/pdf/bp_rac_dw.pdf.

PCT/US2009/057526 International Search Report and Written Opinion dated Sep. 18, 2009, 17 pages.

Current claims, PCT/US2009/057526 filed Sep. 18, 2009, 10 pages.

O'Neil, P., et al., "Multi-table joins through bitmapped join indices", SIGMOD Record, ACM, New York, NY, US, vol. 24, No. 3, (56) References Cited

OTHER PUBLICATIONS

Sep. 1, 1995, pp. 8-11, ISSN: 0163-5808.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.
Zhe, Li, et al., "PERF join: an alternative to two-way semijoin and Bloomjoin" Proceedings of the 1995 ACM CIKM International Conference on Information and Knowledge Management ACM New York. NY, US., 1995, pp. 187-144, ISBN: 0-89791-812-6.
Graefe et al., "Hash joins and hash teams in Microsoft SQL server," 1998. Proceedings of the 24$^{th}$ VLDB Conference New York, USA, pp. 87-90. http://www.sigmod.org/vldb/conf/1998/p086.
Umamageswaran, U.S. Appl. No. 15/410,496, filed Jan. 19, 2017, Office Action dated Oct. 23, 2018.
Umamageswarn, U.S. Appl. No. 15/410,496, filed Jan. 19, 2017, Interview Summary dated Jan. 23, 2019.
Palkar, et al., "Filter Before You Parse: Faster Analytics on Raw Data with Sparser", Proceedings of the VLDB Endowment, vol. 11, No. 11, dated 2018, 14 pages.
Mustard et al., "JumpGate: Towards In-Network Data Processing", dated 2019, 3 pages.
Kornacker et al., "Impala: A Modern, Open-Source SQL Engine for Hadoop", 7th Biennial Conference on Innovative Data Systems Research (CIDR'15) dated Jan. 4-7, 2015, 10 pages.
Balkesen et al., "RAPID: In-Memory Analytical Query Processing Engine with Extreme Performance perWatt", SIGMOD'18, Jun. 10-15, 2018, Houston, TX, USA, 13 pages.
Agrawal et al., "A Many-core Architecture for In-Memory Data Processing", MICRO-50, Oct. 14-18, 2017, Cambridge, MA, USA, 14 pages.
Umamageswaran, U.S. Appl. No. 15/410,496, filed Jan. 19, 2017, Final Office Action dated Apr. 26, 2019.
Umamageswaran, U.S. Appl. No. 15/410,496, Filed on Jan. 19, 2017, Office Action dated Sep. 9, 2019.
Umamageswaran, U.S. Appl. No. 15/410,496, Filed Jan. 19, 2017, Interview Summary dated Jul. 8, 2019.
Umamageswaran, U.S. Appl. No. 15/410,496, Filed Jan. 19, 2017, Advisory Action dated Jul. 22, 2019.

* cited by examiner

OPTIMIZING A QUERY WITH EXTREMA FUNCTION USING IN-MEMORY DATA SUMMARIES ON THE STORAGE SERVER

CROSS-REFERENCE TO RELATED APPLICATIONS; BENEFIT CLAIM

This application claims the benefit of Provisional Appln. 62/056,331, filed Sep. 26, 2014, the entire contents of which is hereby incorporated by reference as if fully set forth herein, under 35 U.S.C. § 119(e).

FIELD

Embodiments described herein relate generally to databases, and more specifically, to techniques for query processing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database system includes a database server that maintains and provides access to a database. The database system further includes a storage system that stores the database. Typically, to respond to a query, a database server obtains all relevant records from the storage system and processes the records to generate the result set. Traditional storage systems suffer from bandwidth issues that limit scalability and overall database performance.

A storage system of a database system may include a storage server. A storage server provides storage services to the database server, and can be configured to perform some optimizations to improve performance. For example, a database server can offload database processing to the storage server when the storage server is configured to perform such offloaded database operations.

Oracle's Exadata Storage Server includes a SQL engine that can perform predicate evaluation offloaded from the database server. In this case, when a query includes a predicate, the storage server returns records filtered according to the predicate, thereby eliminating unnecessary data transfers. When the selectivity of the predicate is high, the majority of rows can be eliminated at the storage server, resulting in lower data transmission bandwidth and reducing processing at the database server.

As used herein, the term "extrema function" refers to a function that returns one or more extrema values from a set, such as one or more minimum values and/or one or more maximum values of the set. The plural form of the term "extrema" is used herein to refer to a class of functions and the results thereof, including singular functions and/or singular results; thus the usage herein of the plural form "extrema" applies to both plural and singular cases, such as when a particular extrema function returns a single minimum value or a single maximum value.

A query may include an extrema function that is applied to a particular column and a particular set of data that returns one or more extrema values for the particular column in the particular set of data. The set of data may be a table or any portion thereof, such as a particular range and/or partition. The set of data may also be limited by a filter predicate that is included in the query. As used herein, the term "filter predicate" refers to a predicate that is evaluated at the row level.

Due to the nature of extrema functions, approaches for evaluation of an extrema function read each record of the particular set of data. For example, in response to a SQL query with a MIN function on a column of a set of records, the column value for the set of records must be read from storage. The return value for the extrema function can be computed in one pass as the set of records are read. Thus, the query execution time with respect to evaluating the extrema function is largely dictated by I/O latency.

Based on the foregoing, it is desirable to provide optimizations for executing query with an extrema function.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for optimizing a query with an extrema function using in-memory data summaries. The in-memory data summaries are maintained on one or more storage systems accessible to a database system. When a database server processes a query that includes an extrema function, the evaluation of the extrema function is offloaded from a database server to one or more storage servers of the storage system that store the database. The one or more storage servers are configured to optimize evaluation of the extrema function.

The one or more storage servers maintain in-memory data summaries for a plurality of extents of the database. The in-memory data summaries are stored in a main memory, such as a main memory of the one or more storage servers. As used herein, the term "main memory" refers to random accessible memory, including non-volatile random-access memory (NVRAM), dynamic random-access memory (DRAM) and/or static random-access memory (SRAM). As used herein, the term "extent" refers to a set of allocated database blocks in a database. In one embodiment, an extent is a set of contiguous database blocks. Alternatively and/or in addition, an extent may be any allocation of database blocks, including one or more non-contiguous sets of database blocks. An extent includes database blocks that are allocated to store records belonging to a particular relation, such as a particular table.

The in-memory data summary may include extent summary values, such as an extent minimum value and an extent maximum value for one or more columns in a set of one or more records that is stored in the corresponding extent. In one embodiment, one or more minimum extent values and/or maximum extent values of the data summary may be a conservative boundary value. A conservative boundary value indicates that the extent does not contain any more extreme value than the conservative boundary value. However, the extent is not guaranteed to include the specified extent summary value. The data summary may be more efficient to maintain when the minimum values and/or maximum values are conservative boundary values.

The extrema function is applied to a particular column and a particular set of records that are stored in a set of relevant extents. The set of relevant extents may be determined by the database server or the storage server, as shall be described in greater detail hereafter. When evaluation of an extrema function of a query is offloaded to the one or more storage servers, the one or more storage servers process the set of relevant extents using the in-memory data summary for each relevant extent to determine whether to scan the records stored in each relevant extent. Additionally, in a multiple storage server system, one or more global extrema values may be maintained across multiple storage servers, which may be used to determine whether to scan a relevant extent local to one of the multiple storage servers. A global extrema value may be based on either an extent summary value from an in-memory data summary or an actual value in the column in an extent that was scanned.

In this manner, I/O operations to storage media are eliminated for one or more of the relevant extents. Scanning the records of a relevant extent requires an I/O operation to storage media, which involves much greater latency than reading the in-memory data summary. Thus, the latency incurred by an I/O operation to storage media can be avoided if it is determined that the records for an extent do not need to be scanned.

As a basic principle, if the data summary of a relevant extent contains an extent summary value that is less extreme than the global extrema value, then the relevant extent potentially does not need to be scanned because a more extreme value has already been potentially located in another relevant extent. One or more factors may affect the manner in which data summaries are evaluated and/or the order in which one or more relevant extents are scanned, such as the precision of the extrema summary value in the data summary, whether the summary is a conservative boundary value or an updated extrema value, the type of result requested by the storage server request, and/or whether the query includes a predicate filter. These scenarios shall be described in greater detail hereafter.

Example Architecture

Figure 1:
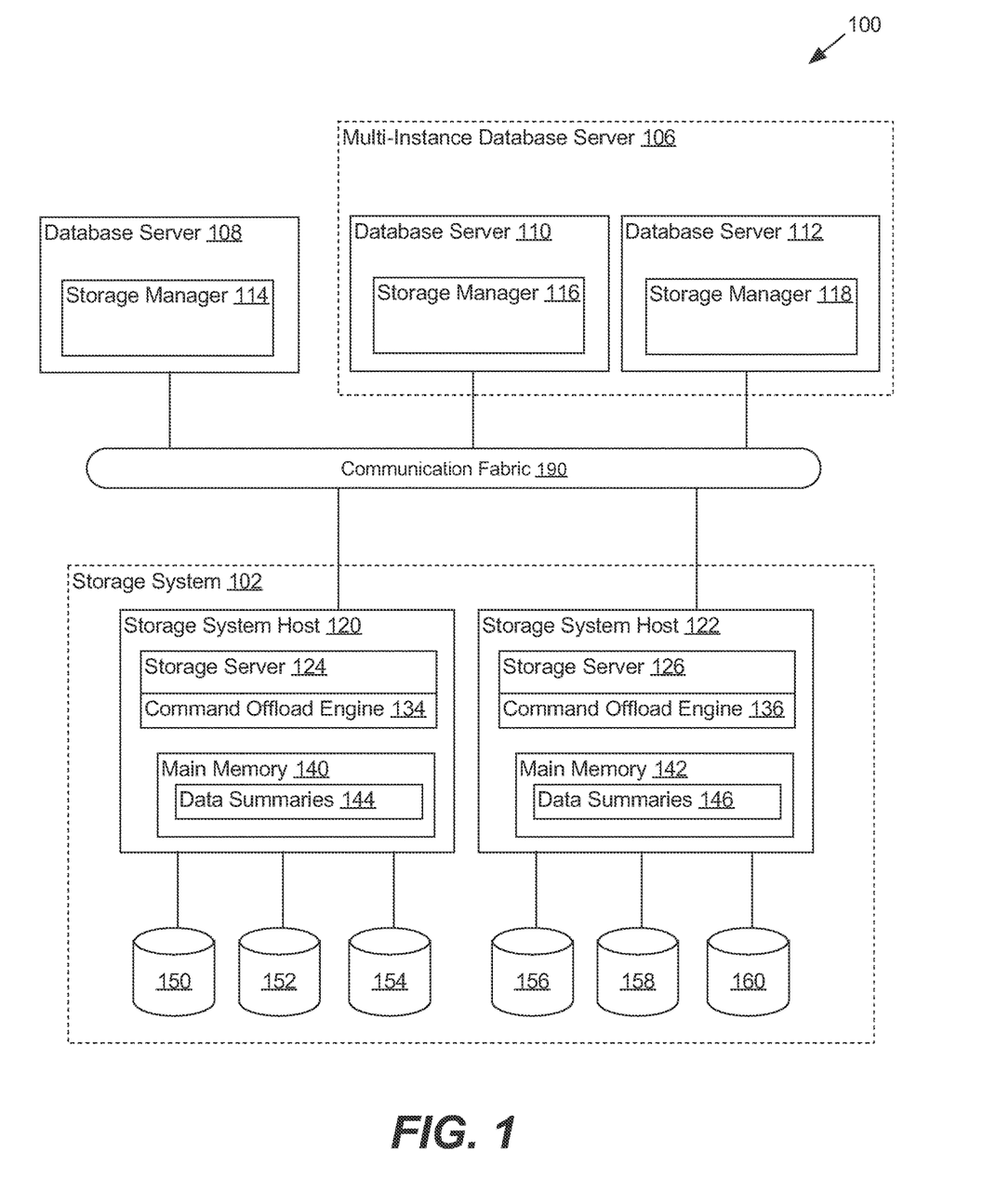
FIG. 1 is a block diagram depicting an example system architecture which may be used to implement one or more embodiments.

FIG. 1 is a block diagram depicting an example system architecture which may be used to implement one or more embodiments. Database system 100 includes storage system 102. Storage system 102 stores databases corresponding to one or more databases servers 106-108. Two database servers 106-108 are shown to illustrate that storage system 102 can handle multiple databases; however, an embodiment may include a storage system configured to store a single database. Database server 108 is a single-instance database server. Database server 106 is a multi-instance database server that supports multiple database server instances 110-112.

Generally, a server, such as a database server, is a combination of integrated software components and an allocation of computational resources, such as memory and processes on a computer for executing the integrated software components, where the combination of the software and computational resources are dedicated to providing a particular type of function on behalf of clients of the server.

Database servers 108-112 are configured to process requests by clients to access the respective databases stored in storage system 102. Database servers 108-112 are configured to take advantage of the optimizations provided by storage system 102. For example, database servers 108-112 may be configured to offload database processing to storage system host 120. Database servers 108-112 may each include a respective storage manager 114-118. Storage manager 114-118 includes software configured to interact with storage components of storage system 102. In one embodiment, storage managers 114-118 are exposed to logical storage components that correspond to physical storage components within storage system 102. One example of a storage manager 114-118 is the Oracle Automatic Storage Management (ASM), which acts as a cluster volume manager and file system used to manage Oracle Exadata storage system resources. Alternatively, one or more techniques described herein may be practiced in a storage system 102 without any specialized storage manager 114-118 in the database server 108-112.

Communication fabric 190 includes one or more networking components that allow database servers 108-112 to communicate with storage system 102. In one embodiment, communication fabric 190 includes specialized network components that are designed for low-latency and high-bandwidth applications, such as but not limited to one or more InfiniBand™ components.

Storage Server

A storage device is a block mode device. A block mode device provides access to data in units referred to as a data block. A data block is the atomic unit of data from primary storage that a storage device client may request from a storage device. The data blocks may reside on one or more storage media devices, such as storage media devices 150-160. A storage device client, such as database servers 108-112, may request a data block or a range of data blocks, such as by making one or more I/O requests.

Storage system 102 includes one or more storage system hosts 120-122. Storage system hosts 120-122 include computer hardware components, and may further include software components. One or more storage servers 124-126 execute on storage system hosts 120-122. Storage servers 124-126 are integrated software components and allocations of computational resources, such as memory and processes of the corresponding storage system host 120-122. Database servers 108-112 are clients of storage servers 124-126. For example, database servers 108-112 may send storage server requests to storage servers 124-126. In one embodiment, storage server requests are in the form of I/O requests that identify a target location of the respective I/O request within storage system 102.

Command offload engines 134-136 also execute on storage system hosts 120-122. Command offload engines 134-

136 are software components that are configured to perform one or more database operations that were originally submitted to a database server 108-112. Command offload engines 134-136 may be fully integrated, partially integrated or unintegrated with storage servers 124-126. In one embodiment, the storage server requests from database servers may further include offload processing metadata. For example, a storage server request from a database server 108-112 may include one or more I/O requests, a filter predicate, and/or an indication that the one or more command offload engines 134-136 should apply the filter predicate to the one or more I/O requests and returning a result set that is already filtered by the filter predicate. Such storage server requests may be communicated via an enhanced I/O protocol. An example protocol suitable for such communications is Oracle's iDB protocol.

Storage server hosts 120-122 include main memory 140-142, such as a random access memory (RAM) or another dynamic storage device. Data summaries 144-146 are stored in main memory 140-142. Storage server hosts 120-122 may maintain, in main memory 140-142, a data summary for one or more extents. An extent is a set of allocated database blocks that are allocated for a particular table or other relation. An extent may include any unit of storage in a database, including data stored in a third party database.

Storage system 102 further includes storage media devices 150-160. Examples of storage media devices 150-160 include one or more disk drives, solid-state drives, FLASH memory devices, or any other storage media devices suitable for database storage. Storage media devices 150-160 store data blocks that are associated with a data block address which uniquely identifies the data block and the data block's storage location within a storage device 150-160.

Some of storage media devices 150-160 may be used for different functions, such as backup, caching, failover, and other functions. In one embodiment, each storage server 124-126 manages a set of storage media devices 150-160 comprising drives that are managed by storage servers 124-126, where the drives are logically divided into logical storage components that are exposed to database servers 108-112. In this manner, the storage media devices 150-160 are made available to store one or more databases. Storage media devices 150-160 may also include one or more reserved portions that are used by storage system host 120-122 and/or storage server 124-126.

A plurality of extents is allocated for the one or more databases stored in storage media devices 150-160. For example, the storage manager 116 of database server 110 may request the allocation of one or more extents in storage system 102 for a particular table of database 106. If the extent is allocated in storage media device 160, then storage server 126 stores and maintains one or more records in the extent in storage media device 160. Storage server 126 also maintains a data summary for the extent in main memory 142 of storage system host 122.

Data Summary

A data summary for an extent includes one or more extent summary values for one or more columns of the table for which the extent is allocated. The one or more columns of the table that are included in the data summary may include all the columns of the table or a subset of the columns of the table, which may be specified by a user, such as an administrator. Alternatively and/or in addition, one or more of the columns included in the data summary may be automatically determined. Extent summary values for a particular column may include an extent minimum value and an extent maximum value for the particular column in all records stored in the extent.

More generally, the extent summary values of a data summary may include statistics and/or aggregate values performed over the records stored in the extent. For example, the extent minimum value and the extent maximum value corresponding to a column of the table are both statistics with respect to records of the table that are stored in the extent.

In a data summary for an extent, one or more of the extent summary values may be null. For example, an extent may have one or more null extent summary values if it contains no records, or if its records all contain null values for a column corresponding to the null extent.

In the embodiment shown in FIG. 1, data summaries are stored in main memory 140-142 of storage server hosts 120-122. Alternatively, data summaries may be managed by other entities. For example, data summaries may be managed by an external data store, an external server, or as a layer within the database server when no dedicated storage server exists.

In one embodiment, data summaries are implemented for a portion of the extents storing a database. For example, in a system that generates a data summary when certain conditions or operations occur, the conditions and/or operations may not have yet occurred with respect to one or more extents. When calculating an extrema function, extent summary values may be used to potentially eliminate I/O operations for extents that have a corresponding data summary, while extents without a corresponding data summary may be scanned.

Conservative Boundary Values

In one embodiment, one or more extent summary values are conservative boundary values. A conservative boundary value indicates that the extent does not contain any more extreme value than the conservative boundary value. However, the extent is not guaranteed to include the specified extent summary value. Extent minimum values and/or extent maximum values are more efficient to maintain when they are conservative boundary values.

When a write I/O is handled that adds a record to an extent or updates a record in the extent, the extent summary values may be updated by comparing new column value/s from the write operation with the current extent summary values in the data summary for the extent. For example, if a write I/O changes the value for column B in a particular record from 3 to 0, and the current extent minimum value for column B is 1 in the extent's data summary, then the extent minimum value in the extent's data summary should be updated to 0.

When a record is deleted from or modified in an extent, there is the potential to remove a current extrema value from a record in the extent. If an extent summary value in the data summary is based on the deleted record or the modified value, then all records in the extent must be scanned to obtain an updated extrema value for the particular column. For example, if the current extent maximum value for column C is 100, and a record containing a value of 100 for column C is deleted or modified to less than 100, then determining an updated extrema value to replace the extent maximum value would require a scan of all the records in the extent.

However, if the extent maximum value is maintained as a conservative boundary value, then performing the scan on all the records of the extent is not necessary. For example, if the true maximum value for column C is now 90, but no scan is performed and the extent maximum value is not changed from 100, the extent maximum value is still an accurate conservative boundary value, because every record in the extent is guaranteed to have a value no greater than 100 in column C. Thus, even though the extent maximum value is not updated for column C to the updated extrema value, the extent maximum value can be maintained as conservative boundary value without incurring the overhead of re-scanning the extent.

In one embodiment, one or more extent summary values are updated periodically. For example, one or more extent summary values can be updated when a scan of the extent is performed in the course of another storage server operation. Alternatively and/or in addition, the scan may be specifically performed to update the extent summary values. Such a scan may be performed periodically, during off-peak operation or other low workload periods, on a database reload operation, and/or at any other suitable time.

When the extent summary values maintained in the data summary are conservative boundary values, additional computation is avoided, and the conservative boundary value is still useful for optimizing extrema function evaluation. In particular, a conservative boundary value, when maintained in main memory, is still useful to determine whether to scan records of an extent to determine the results of an extrema function. For example, when searching for a minimum value for column D, if it is known that a minimum value of 50 has been potentially found in another extent, then scanning of an extent with a minimum extent summary value of 100 for column D can potentially be avoided. This is true even if the extent summary value is a conservative boundary value rather than an updated extrema value.

Global Extrema Value

When processing a relevant extent that is relevant to a query, a storage server 124-126 determines whether to scan records of a relevant extent based on at least one global extrema value and an extent summary value of the data summary of the relevant extent. A global extrema value is maintained by one or more storage servers 124-126. A global extrema value may be updated based on an extent summary value from an in-memory data summary. Alternatively and/or in addition, a global extrema value may be updated based on an actual value in the column in an extent that was scanned to determine an extrema value that satisfies the extrema function with respect to the records contained in the scanned extent.

Processing Relevant Extents Based on Data Summary and Global Extrema Value

In one embodiment, the set of relevant extents is processed in parallel on multiple storage servers 124-126. For example, a particular storage server 124 may process the relevant extents that are relevant to the query that are allocated on the storage media devices 150-154 that are associated with the particular storage server 124, while another storage server 126 may process the relevant extents allocated on storage media devices 156-160. A global extrema value may be maintained at each of the storage servers 124-126 as extents are processed. The global extrema values maintained at each storage server 124-126 may be synchronized between storage servers 124-126. The global maximum value may be updated based on an extent summary value or an actual extent extrema value for an extent that was determined by scanning the records contained in the extent.

Processing a relevant extent involves determining whether to scan records of the relevant extent based on the global extrema value and an extent summary value of the data summary of the relevant extent. The extent summary value corresponds to the particular column and the extrema function. For example, when the extrema function is a maximum value function, an extent maximum value of a particular extent may be compared to a global maximum value. When the extent maximum value is greater than the global maximum value, the global maximum value may be updated with the extent maximum value, subject to the limitations described herein, such as when the extent maximum value is truncated or padded, the extent maximum value is a conservative boundary value, and/or when the query includes one or more filter predicates.

In one embodiment, to address the limitations described above (e.g. such as when the extent maximum value is truncated or padded, the extent maximum value is a conservative boundary value, and/or when the query includes one or more filter predicates), the extent summary values are used to more efficiently search for the extrema value. All extent summary values are first processed to determine a likely extrema value contained in a particular relevant extent. The particular relevant extent is then scanned. No matching record may be found due to one of the limitations, which shall be described in greater detail hereafter. If no matching record is found, then a next likely relevant extent is scanned to look for a next likely extrema value contained therein. Thus, the need to scan a relevant extent can be potentially eliminated based on the global extrema value, since the global extrema value may not be based on an actual value in an existing record that satisfies any filter conditions. Once a likely extrema value is actually found in a likely relevant extent, no more scanning is necessary. The initial processing of the data summaries and the subsequent scanning of likely relevant extents may be performed in parallel, such as on multiple storage servers 124-126. Thus, a large number of I/O operations are still potentially avoided.

In another solution that may be used alternatively and/or in addition to the prior solution, actual extrema values are found by scanning particular relevant extents, and definitive decisions are made to skip scanning of subsequent relevant extents. In one embodiment, definitive decisions to skip scanning a particular relevant extent are not revisited. An initial relevant extent is scanned to determine an actual extent extrema value of the initial relevant extent. Then, the global extrema value is updated based on the actual extent extrema value. Then, for subsequent relevant extents, the extent summary value is used to determine whether the relevant extent potentially contains an extrema value that is more extreme than the actual extent extrema value previously found. Thus, the need to scan a relevant extent can be definitively eliminated based on the global extrema value, since the global extrema value is based on an actual value in an existing record that satisfies the any filter conditions. Such processing may be performed in parallel, such as on multiple storage servers 124-126.

In the case that no data summary is available for a particular extent, or the data summary is marked as unreliable, the particular extent can be scanned to determine the extrema value within the extent that pertains to the extrema function. For example, the data summary may be marked as unreliable due to maintenance activity, database failure and recovery activity, and the like.

Consider an example query: SELECT MAX(COL_A) FROM T1. When a database server 108-112 receives the example query, the database server 108-112 offloads the MAX( ) function to the one or more storage servers 124-126. In an embodiment, the storage servers 124-126 determine the relevant extents to the query. In another embodiment that may be implemented alternatively and/or in addition, database servers 108-112 may be exposed to the extents, such as through storage managers 114-118. In this case, database servers 108-112 will determine the relevant extents and send, to storage servers 124-126, one or more storage server requests comprising a plurality of I/O requests corresponding to the relevant extents. The storage server request may be enhanced to include metadata that indicates that the MAX( ) function should be processed by the storage servers 124-126. The storage servers 124-126 will perform the maximum value function by processing the relevant extents that store the records of table T1 as indicated by the query. For each relevant extent, the storage servers 124-126 will inspect the corresponding data summary 144-146 stored in main memory 140-142, and will determine whether an I/O operation should be performed to scan the extent, or whether the I/O operation extent should be skipped. For example, if the extent has an extent maximum value that is greater than the global maximum value, then the extent should be scanned. If the extent has an extent maximum value that is less than the global maximum value, then the extent potentially does not need to be scanned to respond to the example query.

Figure 2:
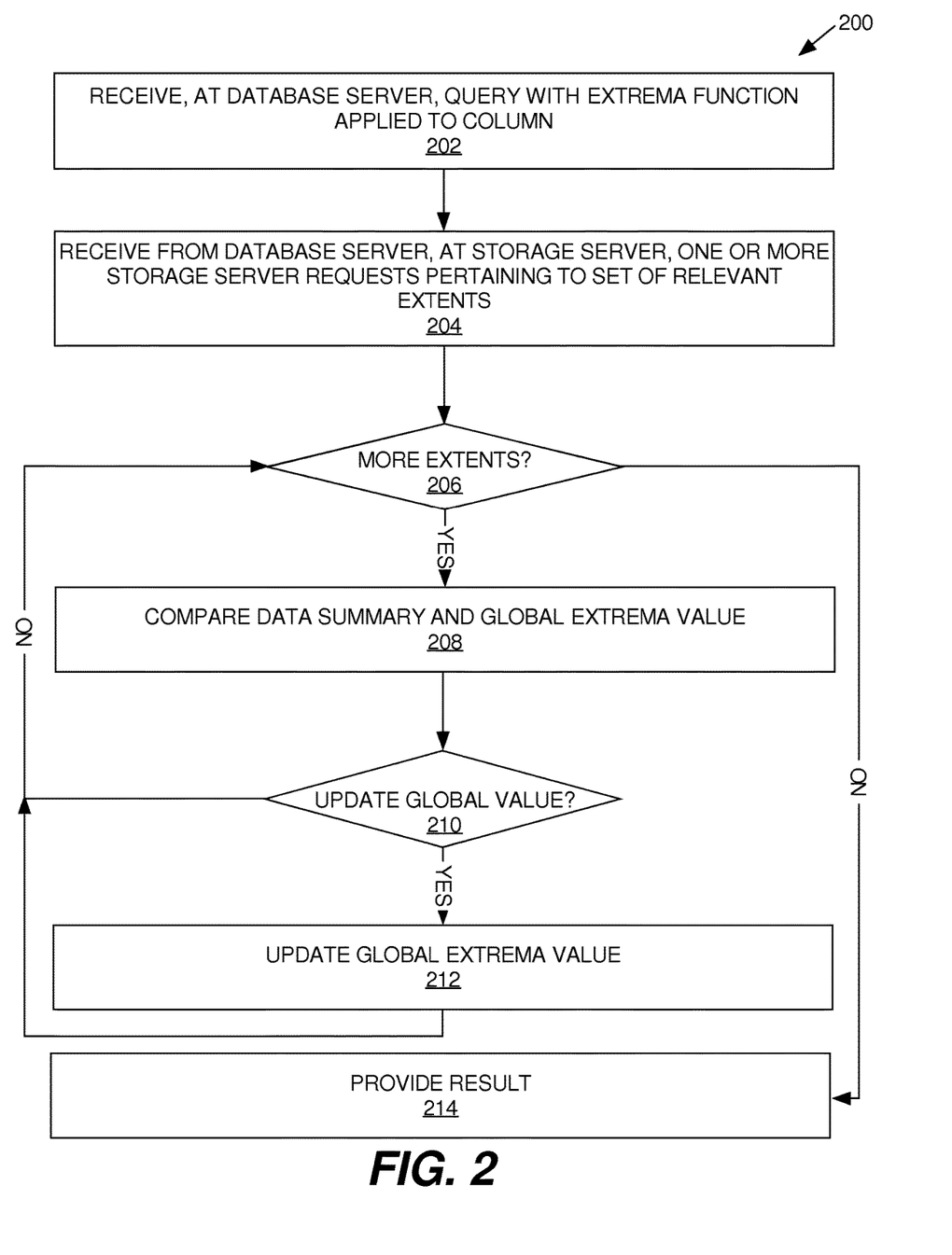
FIG. 2 is a flow diagram that illustrates an embodiment of a process for optimizing an extrema function in a query.
Figure 5:
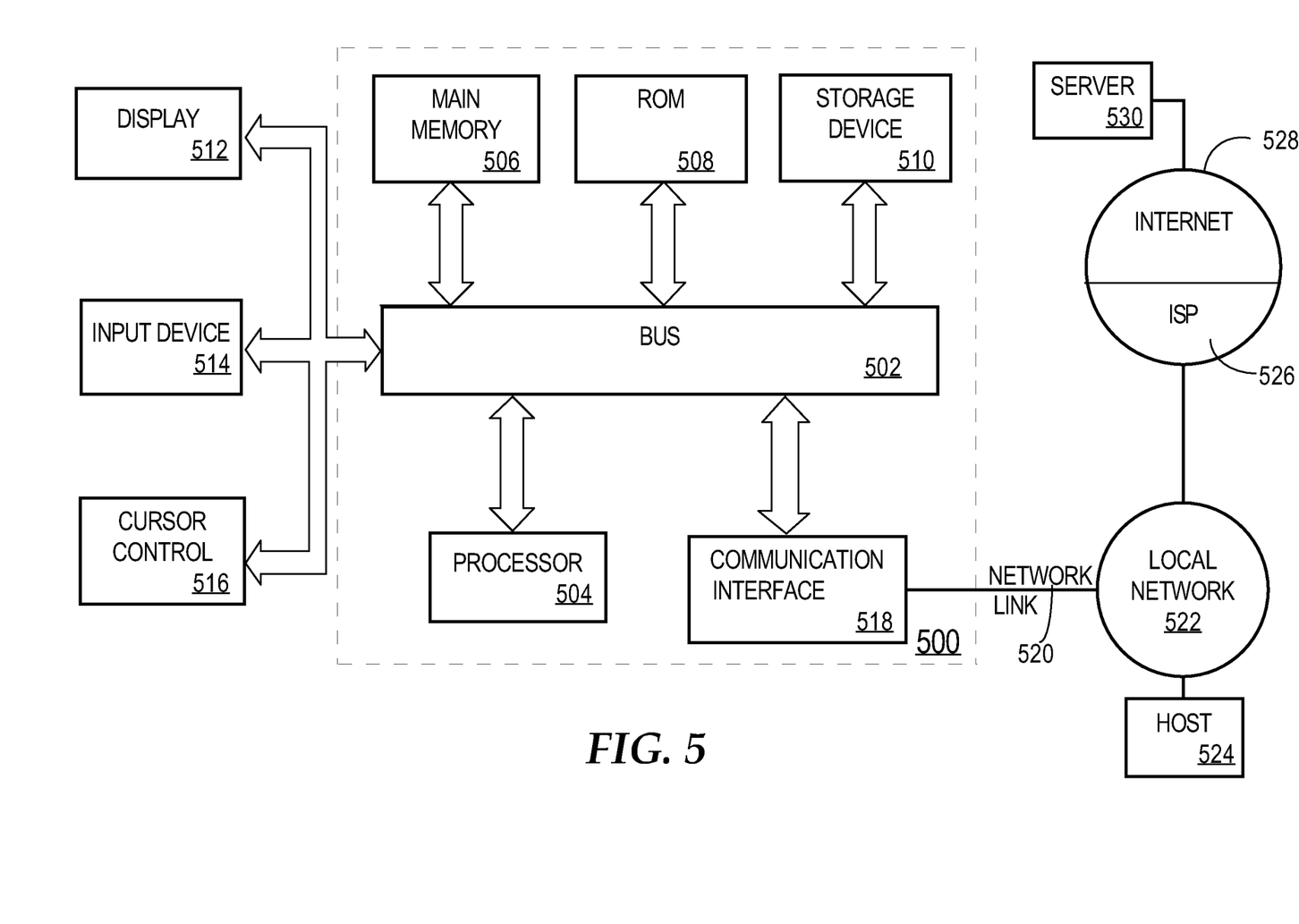
FIG. 5 illustrates a computer system upon which one or more embodiments may be implemented.

FIG. 2 is a flow diagram that illustrates an embodiment of a process for optimizing an extrema function in a query. Process 200 may be performed by one or more computing devices and/or processes thereof, and portions of process 200 may be parallelized. For example, one or more blocks of process 200 may be performed by computer system 500.

At block 202, a database server 108-112 receives a query from a database client. The query includes an extrema function that is applied to a particular column of a particular table. The extrema function is selected from a minimum value function and a maximum value function.

At block 204, at least one storage server receives, from the database server, one or more storage server requests pertaining to a set of relevant extents that are relevant to the query. In an embodiment, the one or more storage server requests comprise a plurality of I/O requests corresponding to a set of relevant extents that are determined by the database server. In another embodiment, the storage server request comprises information contained in the query that allows the at least one storage server to determine the set of relevant extents that are relevant to the query.

At decision block 206, it is determined if the more relevant extents remain to be processed. If it is determined that no relevant extents remain to be processed, processing proceeds to block 214. If it is determined that more relevant extents remain to be processed, processing proceeds to block 208.

At block 208, for a current relevant extent, the data summary stored in main memory for the current relevant extent is compared to a global extrema value that is maintained by the one or more storage servers. More specifically, the comparison involves one or more extent summary values that correspond to the particular column to which the extrema function is applied.

At decision block 210, it is determined whether to update the global extrema value based on the comparison. If it is determined to update the global extrema value based on the comparison, then processing continues to block 212. Otherwise, processing continues to decision block 206.

In one embodiment, the global extrema value is updated if a more extreme value exists in a record in the current relevant extent. Under some conditions, which are described in greater detail hereafter, the extent summary values guarantee the existence of a record that contains the extent summary value, and only one I/O to an extent corresponding to the global extrema value is necessary after all extents are processed.

Under other conditions, which are described in greater detail hereafter, an extent summary value does not guarantee the existence of a record in the corresponding extent that corresponds to the extent summary value. For example, such conditions include when the extent summary values are padded or truncated, the extent summary values are conservative boundary values, and/or the query includes a filter predicates. In one embodiment, each relevant extent is processed by obtaining and sorting the extent summary value corresponding to the extrema function. In this case, maintaining the global extrema value relates to the sorted extent summary values of this initial processing step. Subsequently, based on the initial processing, I/O operations are performed in order of likelihood to scan extents that potentially contain records that satisfy the query and/or contain the extrema values indicated by the extent summary value. Processing can terminate when a satisfactory value is found where the extent summary values can guarantee that the identified record contains the extrema value indicated by the query. In another embodiment, which may be implemented alternatively and/or in addition, the determination to perform an I/O operation to scan a current relevant extent may be performed based on its extent summary value.

At block 212, the global extrema value is updated. Processing continues to decision block 206, where it is determined whether more relevant extents remain to be processed.

At block 214, a result is provided to the database server. If any remaining I/O operations need to be performed, such operations are performed to determine the result. As described with respect to steps 206-212, I/O operations may be performed as each relevant extent is processed.

Applying Filter Predicates

In one embodiment, the query includes a filter predicate. For example, the query SELECT MAX(COL_A) FROM T1 WHERE COL_B>10 includes a filter predicate COL_B>10. The extent summary values for COL_A may still be used to potentially eliminate an I/O operation to scan a particular relevant extent. However, from the data contained in the in-memory data summary, it cannot be determined whether the record that that corresponds to a particular extent summary value also satisfies a filter predicate. To determine whether the extent summary value corresponds to a record that actually satisfies the filter predicate, an I/O operation must be performed to scan the extent. Two techniques for processing the filter predicate are described in FIG. 3 and FIG. 4, which may be used in a system alternatively or in addition to each other.

Figure 3:
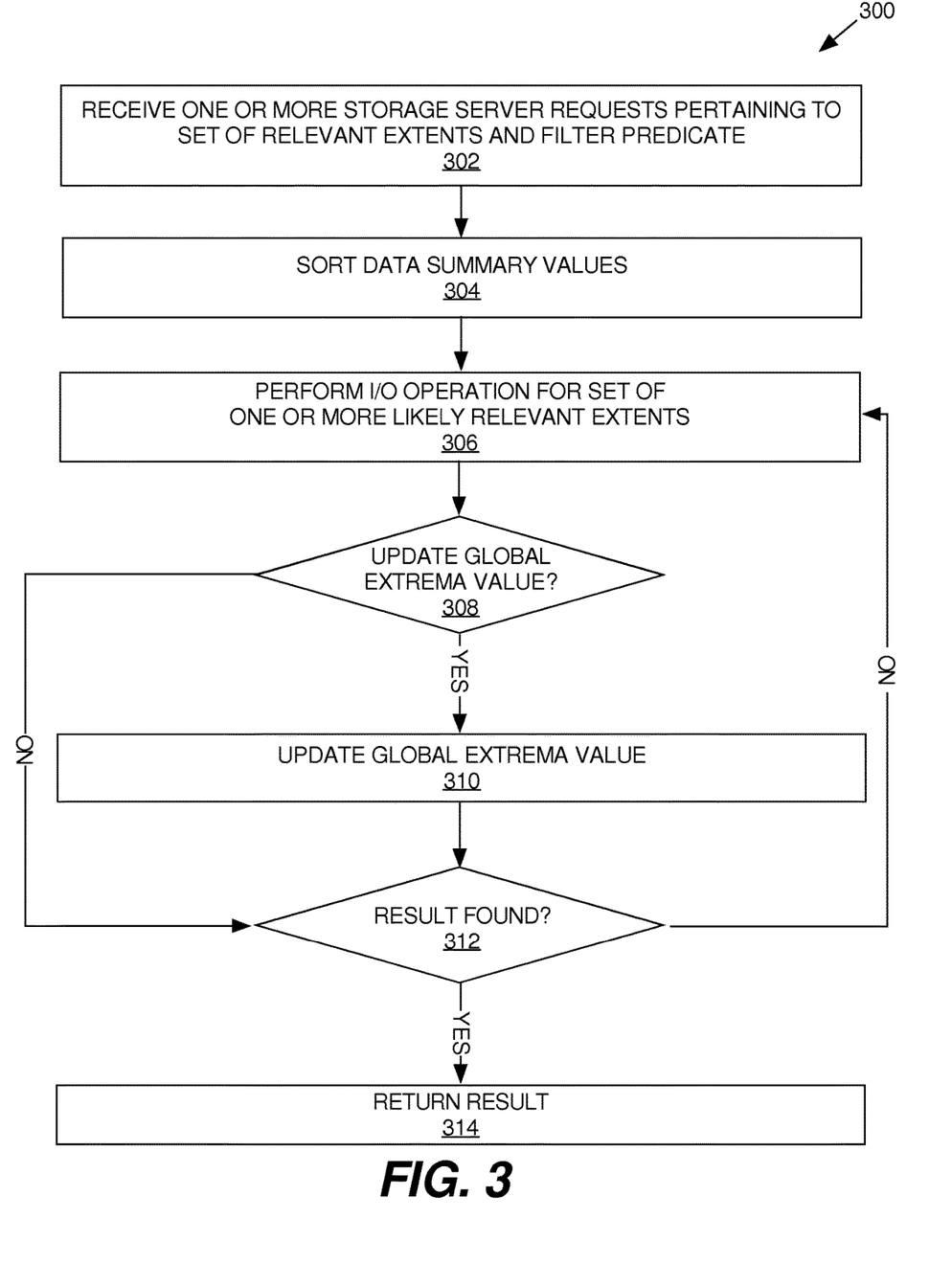
FIG. 3 is a flow diagram that illustrates an embodiment of a process for optimizing an extrema function in a query that includes a filter predicate.

FIG. 3 is a flow diagram that illustrates an embodiment of a process for optimizing an extrema function in a query that includes a filter predicate. Process 300 may be performed by one or more computing devices and/or processes thereof, and portions of process 300 may be parallelized. For example, one or more blocks of process 300 may be performed by computer system 500.

At block 302, one or more storage server requests are received. The one or more storage server requests pertain to a set of relevant extents, an extrema function, and a filter predicate. In an embodiment, the one or more storage server requests comprise a plurality of I/O requests corresponding to a set of relevant extents that are determined by a database server in response to processing a query that includes the extrema function and the filter predicate.

At block 304, data summary values of the set of relevant extents are sorted. More specifically, one or more extent summary values of one or more relevant extents are sorted, where the extent summary values correspond to a particular column to which the extrema function is applied. In one embodiment, the relevant extents are local to multiple storage servers. In this case, the extent summary values may be initially sorted locally on individual storage servers, or may be globally sorted across the multiple storage servers.

At block 306, I/O operations are performed for a set of one or more likely relevant extents to find extrema values that satisfy the filter predicate. In one embodiment, the extent summary values are sorted locally, and each individual storage server performs an I/O operation to scan the relevant extent that corresponds to the most extreme extent summary value based on the local sorting.

At decision block 308, it is determined whether to update the global extrema value based on the I/O operation. For example, if the scan of the relevant extent determines that the extrema value that satisfies the filter predicate in the extent is X, and the global extrema value is Y, then the global extrema value Y should be updated to X if X is more extreme than Y. If it is determined to update the global extrema value based on the comparison, then processing continues to block 310. Otherwise, processing continues to decision block 312. At block 310, the global extrema value is updated. Processing continues to decision block 312.

At decision block 312, it is determined whether the result for the extrema function has been found. For example, if, on each of the one or more storage servers, the next extent summary value in the sorted extent summary values is less extreme than the global extrema value, then it is guaranteed that the relevant extents corresponding to the remaining sorted extent summary values will not have a record with a more extreme value that satisfies the predicate. If the result has not been found, processing continues to block 306. Otherwise, processing continues to block 314. At block 314, the result is provided to the database server.

Figure 4:
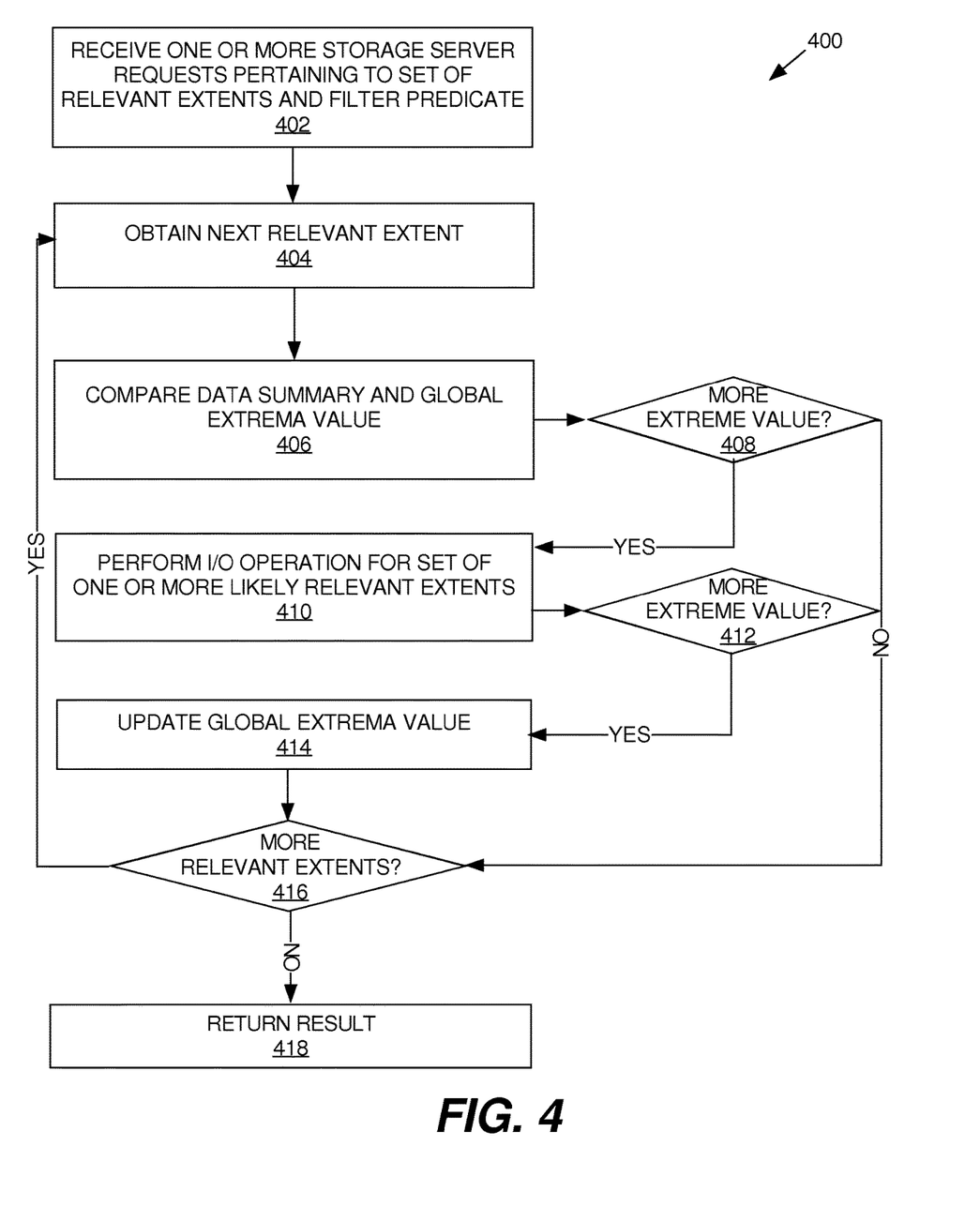
FIG. 4 is a flow diagram that illustrates an embodiment of a process for optimizing an extrema function in a query that includes a filter predicate.

FIG. 4 is a flow diagram that illustrates an embodiment of a process for optimizing an extrema function in a query that includes a filter predicate. Process 400 may be performed by one or more computing devices and/or processes thereof, and portions of process 400 may be parallelized. For example, one or more blocks of process 400 may be performed by computer system 500.

At block 402, one or more storage server requests are received. The one or more storage server requests pertain to a set of relevant extents, an extrema function, and a filter predicate. In an embodiment, the one or more storage server requests comprise a plurality of I/O requests corresponding to a set of relevant extents that are determined by a database server in response to processing a query that includes the extrema function and the filter predicate.

At block 404, a next relevant extent is obtained.

At block 406, the data summary stored in memory for the current relevant extent is compared to a global extrema value that is maintained by the one or more storage servers. More specifically, the comparison involves one or more extent summary values that correspond to the particular column to which the extrema function is applied.

At decision block 408, based on the comparison, it is determined whether the current relevant extent potentially contains a record with a particular column value that is more extreme than the global extrema value. If the current relevant extent potentially contains a more extreme value, processing continues to block 410. Otherwise, processing continues to decision block 416.

At block 410, an I/O operation is performed on the current relevant extent to scan the relevant extent and determine a record of the current relevant extent with the most extreme value that satisfies the filter predicate with respect to the particular column and the extrema function.

At decision block 412, it is determined whether the most extreme value of the current relevant extent is more extreme than the global extrema value. If the current relevant extent is more extreme, processing continues to block 414. Otherwise, processing continues to decision block 416. At block 414, the global extrema value is updated with the most extreme value of the current relevant extent. In one embodiment, relevant extents are processed in parallel on multiple storage servers, and the global extrema value is updated by broadcasting the updated global extrema value to each storage server.

At decision block 416, it is determined whether more relevant extents remain to be processed. If more relevant extents remain to be processed, processing continues to block 404. Otherwise, processing continues to block 418. At block 418, the result, which is the record that is associated with the final global extrema value, is provided to the database server.

Precision of Extent Summary Values

In one embodiment, one or more extent summary values of the data summary are fixed in length, such as a specific byte size or a specific bit size. Thus, padding and/or truncation of actual values stored in a column may occur in order to meet the fixed length constraint. For example, if more space is specified than is needed to accommodate the binary representation of a column value, the extra space is padded, such as with zeros. If less space is available than is needed to accommodate the binary representation of a column value, the column value is truncated and part of the column value is lost. Often, a padded or truncated extent summary value may still be useful as an approximate value for comparisons, even if the extent summary value is not precise. However, such an approximate extent summary value should not be directly returned with respect to the extrema function. Instead, the precise value can be obtained by scanning the extent associated with the data summary comprising the extent summary value.

Type of Result Requested by the Storage Server Request

In one embodiment, a database server 108-112 expects, in response to a storage server request, a set of records in the same format as the request. For example, if the storage server request includes an extrema function applied to a particular column of a particular table, then the database server 108-112 expects, from storage server 124-126, a record of the particular table.

When database server 108-112 expects a set of records in the same format as the I/O request (e.g. as a row of the table corresponding to the I/O request), then at least one storage server 124-126 must perform at least one I/O to retrieve the record from the appropriate extent. When the database server 108-112 sends the storage server request based on a query that does not include any filter predicates, then exactly one I/O operation is necessary to retrieve the record from the appropriate extent containing the record with the extrema value that satisfies the extrema function, subject to other limitations described herein.

For example, the single I/O operation may not be achieved when the extent summary value corresponding to the extrema function is padded and/or truncated. In this case, the extent summary value is not precise, so more than one extent may be identified as potentially having the extrema value that satisfies the extrema function. In this case, due to the imprecise or approximate nature of the padded and/or truncated extent summary value, more than one extent may be scanned to obtain the precise value.

In one embodiment, a database server 108-112 expects, in response to a storage server request, a single value corresponding to the actual extrema value required by the extrema function. For example, if the storage server request includes an extrema function applied to a particular column of a particular table, then the database server 108-112 expects, from storage server 124-126, the extrema value specified by the extrema function. When the database server 108-112 sends the storage server request based on a query that does not include any filter predicates, when the precision of the corresponding extent summary value of the data summaries is sufficient to determine an exact value, and when the extent summary value is an updated value rather than a conservative boundary value, then no I/O operation are needed to return the single value corresponding to the actual extrema value required by the extrema function.

Database Systems

A database management system manages a database. A database management system may comprise one or more database servers. A database comprises database data and metadata that is stored on a persistent memory mechanism, such as a set of hard disks. Metadata defines database objects, such as relational tables, table columns, views, and triggers.

Database applications and clients interact with a database server by submitting to the database server commands that cause the database server to perform operations on data stored in a database. A database command may be in the form of a database statement that conforms to a database language.

One of the languages for expressing database requests is the Structured Query Language (SQL). There are many different versions of SQL; some versions are standard, others are proprietary. There is also a variety of extensions to SQL. SQL data definition language (DDL) instructions may be issued to a database server to create or configure database objects, such as tables, views, or complex data types. SQL/XML is a common extension of SQL used when manipulating XML data in an object-relational database.

Generally, data is logically arranged within a database in one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the presented approach are not limited to any particular type of data container or type of database architecture. However, for the purpose of explanation, the examples and the terminology used herein are usually associated with relational or object-relational databases. Thus, the terms "table," "row," and "column" are used herein to refer respectively to the data container, record, and field.

Data containers are typically stored on a hard disk in one or more data blocks. Hence, while instructions or queries issued to a database server refer to data as tables, rows, and columns, that data is actually stored in a database as a collection of data blocks. Through the use of various stored metadata, indexes, and headers, the database server is able to interpret the data within the data blocks as logical tables, rows, and columns.

A data block is an atomic unit of storage space allocated to store raw data for one or more database records (e.g., rows) or portions thereof. Typically, a database system is configured to read and write database records from persistent cache and volatile memory in units no smaller than data blocks. When a record, from a data block, needs to be retrieved, an entire data block containing the record (or pertinent portion of the record) is read into a buffer that the database system uses to temporarily store data blocks. The data block read into the buffer may contain other records or portions thereof.

Implementation Systems Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that depicts a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    maintaining a plurality of data summaries of a plurality of extents stored by a plurality of storage servers in random accessible memories of said plurality of storage servers, wherein a respective storage server of said plurality of storage servers for a respective by a respective storage server of said plurality of storage servers for a respective set of extents of said plurality of extents that is stored by said respective storage server;
    wherein each extent of the plurality of extents is allocated to store one or more records of a table, wherein the respective data summary that is stored for the respective set of extents that includes said each extent includes a respective extent summary value for said each extent for a particular column of said table, said respective extent summary value for said each extent being an extent maximum value or an extent minimum value;

receiving from a database server, a storage server request based on a query comprising an extrema function applied to a said particular column of said table, wherein the extrema function is a minimum value function or a maximum value function;

processing said plurality of data summaries, wherein processing said plurality of data summaries comprises:

maintaining a plurality of global extrema values that each correspond to the extrema function, wherein maintaining a plurality of global extrema values comprises each storage server of said plurality of storage servers maintaining a respective global extrema value of said plurality of global extrema values;

synchronizing said plurality of global extrema values by said plurality of storage servers;

for each extent of a subset of said plurality of extents, the respective storage server that is storing said each extent, determining whether to scan records of said each extent by at least comparing the respective global extrema value maintained by the respective storage server that stores said each extent and the respective extent summary value for said each extent included;

responding to the storage server request by providing a result of the extrema function.

2. The method of claim 1, wherein the storage server request comprises a plurality of I/O requests corresponding to a set of relevant extents that includes said plurality of extents, wherein the method further includes the database server determining the set of relevant extents.

3. The method of claim 1, wherein for a particular data summary of said plurality of data summaries, the respective extent summary value for each extent of the respective set of extents of said particular data summary is a conservative boundary value.

4. The method of claim 1, wherein maintaining a plurality of data summaries of a plurality of extents includes, for a particular data summary of said plurality of data summaries a least one of:

updating said particular data summary in response to writing to any extent of the respective set of extents of said particular data summary, and updating said particular data summary in response to scanning any extent of the respective set of extents of said particular data summary.

5. The method of claim 1, wherein the query further comprises a filter predicate;

wherein the result of the extrema function satisfies the filter predicate.

6. The method of claim 5, wherein maintaining a plurality of global extrema values comprises scanning a particular extent of said plurality of extents stored on a particular storage server of said plurality of store servers and applying the filter predicate to ensure that the respective global extrema value maintained by said particular storage server is only updated based on one or more records that satisfy the filter predicate.

7. The method of claim 1, wherein processing the plurality of data summaries further comprises:

for a particular data summary of said plurality of data summaries, sorting the respective set of extents of said particular data summary based on the respective extent summary value of each extent of the respective set of extents of said particular data summary;

wherein determining whether to scan records of said each extent of the respective set of extents of said particular data summary is based on the sorting.

8. One or more non-transitory storage media storing sequences of instructions, which when executed by one or more computing devices, cause:

maintaining a plurality of data summaries of a plurality of extents stored by a plurality of storage servers in random accessible memories of said plurality of storage servers, wherein a perspective data summary of said plurality of data summaries is stored by a respective storage serve of said plurality of storage servers for a respective set of extents of said plurality of extents that is stored by said respective storage server;

wherein each extent of the plurality of extents is allocated to store one or more records of a table, wherein the respective data summary that is stored for the respective set of extents that includes said each extent includes a respective extent summary value for said each extent for a particular column of said table said respective extent summary value for said each extent being an extent maximum value or an extent minimum value;

receiving from a database server, a storage server request based on a query comprising an extrema function applied to said particular column of said table, wherein the extrema function is a minimum value function or a maximum value function;

processing said plurality of data summaries, wherein processing said plurality of data summaries comprises:

maintaining a plurality of global extrema values that each correspond to the extrema function, wherein maintaining a plurality of global extrema values comprises each storage server of said plurality of storage servers maintaining a respective global extrema value of said plurality of global extrema values;

synchronizing said plurality of global extrema values by said plurality of storage servers;

for each extent of a subset of said plurality of extents, the respective storage server at is storing said each extent, determining whether to scan records of said each extent by at least one comparing the respective global extrema value maintained by the respective storage server that stores said each extent and the respective extent summary value for said each extent included;

responding to the storage server request by providing a result of the extrema function.

9. The non-transitory storage media of claim 8, wherein the storage server request comprises a plurality of I/O requests corresponding to a set of relevant extents that includes said plurality of extents, wherein the sequences of instructions include instructions that, when executed by said one or more computing devices, cause the database server determining the set of relevant extents.

10. The non-transitory storage media of claim 9, wherein the storage particular data summary of said plurality of data summaries, the respective extent summary value for each extent of the respective set of extents of said particular data summary is a conservative boundary value.

11. The non-transitory storage media of claim 8, wherein maintaining a plurality of data summaries of a plurality of extents includes, for a particular data summary of said plurality of data summaries, at least one of:
- updating said particular data summary in response to writing to any extent of the respective set of extents of said particular data summary, and
- updating said particular data summary in response to scanning any extent of the respective set of extents of said particular data summary.

12. The non-transitory storage media of claim 8,
wherein the query further comprises a filter predicate;
wherein the result of the extrema function satisfies the filter predicate.

13. The non-transitory storage media of claim 12, wherein maintaining a plurality of global extrema values comprises scanning a particular extent of said plurality of extents stored on a particular storage server of said plurality of storage servers and applying the filter predicate to ensure that the respective global extrema value maintained by said particular storage server is only updated based on one or more records that satisfy the filter predicate.

14. The non-transitory storage media of claim 12, wherein processing the plurality of data summaries further comprises:
- for a particular data summary of said plurality of data summaries, sorting the respective set of extents of said particular data summary based on the respective extent summary value of each extent of the respective set of extents of said particular data summary;
- wherein determining whether to scan records of said each extent of the respective set of extents of said particular data summary is based on the sorting.

* * * * *

UNITED STATES PATENT AND TRADEMARK OFFICE
CERTIFICATE OF CORRECTION

PATENT NO. : 10,528,590 B2
APPLICATION NO. : 14/726372
DATED : January 7, 2020
INVENTOR(S) : Ng et al.

Page 1 of 1

It is certified that error appears in the above-identified patent and that said Letters Patent is hereby corrected as shown below:

In the Specification

In Column 10, Line 53, delete "that that" and insert -- that --, therefor.

In the Claims

In Column 16, Lines 61-64, in Claim 1, delete "storage server of said plurality of storage servers for a respective by a respective storage server of said plurality of storage servers for a respective" and insert -- data summary of said plurality of data summaries is stored by a respective storage server of said plurality of storage servers for a respective --, therefor.

In Column 17, Line 10, in Claim 1, after "to" delete "a".

In Column 17, Lines 46-47, in Claim 4, delete "summaries a" and insert -- summaries, at --, therefor.

In Column 17, Line 61, in Claim 6, delete "store" and insert -- storage --, therefor.

In Column 18, Line 15, in Claim 8, delete "perspective" and insert -- respective --, therefor.

In Column 18, Line 17, in Claim 8, delete "serve" and insert -- server --, therefor.

In Column 18, Line 25, in Claim 8, after "table" insert -- , --.

In Column 18, Line 46, in Claim 8, delete "at" and insert -- that --, therefor.

In Column 18, Line 48, in Claim 8, after "least" delete "one".

In Column 18, Line 61, in Claim 10, delete "claim 9," and insert -- claim 8, --, therefor.

In Column 18, Line 62, in Claim 10, delete "the storage" and insert -- for a --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*